(12) United States Patent
Fox et al.

(10) Patent No.: US 6,711,525 B1
(45) Date of Patent: Mar. 23, 2004

(54) FILTER MONITOR

(75) Inventors: Tim Fox, Waynesburg, PA (US); Norman L. Seigel, Mentor, OH (US)

(73) Assignee: Pneumatic Products Corporation, Ocala, FL (US)

( * ) Notice: Subject to any disclaimer, the term of this patent is extended or adjusted under 35 U.S.C. 154(b) by 0 days.

(21) Appl. No.: 09/958,613

(22) PCT Filed: Apr. 17, 2000

(86) PCT No.: PCT/US00/10312

§ 371 (c)(1), (2), (4) Date: Apr. 30, 2002

(87) PCT Pub. No.: WO00/62897

PCT Pub. Date: Oct. 26, 2000

Related U.S. Application Data (60) Provisional application No. 60/129,855, filed on Apr. 17, 1999.

(51) Int. Cl.[7] ............................................. B01D 35/143
(52) U.S. Cl. .................................... 702/184; 73/861.42
(58) Field of Search ............................. 702/50, 55, 98, 702/100, 182, 183, 184, 185, 194, 199, 45, 47, 114, 138, 140, 188, 190; 73/37, 861.42, 861.52; 96/6, 18, 50, 58, 400; 60/336; 62/3.4, 640, 120, 401

(56) References Cited

U.S. PATENT DOCUMENTS

| | | |
|---|---|---|
| 3,645,140 A | 2/1972 | Phillips et al. ............ 73/407 R |
| 3,862,387 A | 1/1975 | Phillips et al. ................. 200/83 |
| 4,011,759 A | 3/1977 | Phillips et al. ............ 73/407 R |
| 4,071,047 A | 1/1978 | Greene ................... 137/625.18 |
| 4,282,719 A | 8/1981 | Kountz et al. ................. 62/115 |
| 4,374,475 A | 2/1983 | Hestich ........................ 73/736 |
| 4,514,991 A | 5/1985 | Zinsmeyer ................... 62/209 |
| 4,668,847 A | 5/1987 | Greene ......................... 200/82 |
| 4,718,279 A | 1/1988 | Hestich ........................ 73/734 |
| 4,786,293 A | 11/1988 | Labadie ......................... 55/21 |
| D301,018 S | 5/1989 | Hestich ....................... D10/85 |
| 4,827,095 A | 5/1989 | Clark et al. ................... 200/83 |
| 4,841,782 A | 6/1989 | Buchanan ................ 73/861.74 |
| 4,890,497 A | 1/1990 | Cahill .......................... 73/708 |
| 4,893,479 A | 1/1990 | Gillett et al. ................. 62/213 |
| 4,989,414 A | 2/1991 | Murayama et al. ........ 62/228.4 |
| D316,982 S | 5/1991 | Hestich ..................... D10/102 |
| 5,012,678 A | 5/1991 | Buchanan .................... 73/738 |
| 5,132,500 A | 7/1992 | Clew ........................... 200/83 |
| 5,236,601 A | 8/1993 | Snell et al. ................. 210/741 |
| 5,284,026 A | 2/1994 | Powell ......................... 62/209 |
| 5,303,561 A | 4/1994 | Bahel et al. ................. 62/186 |
| 5,335,507 A | 8/1994 | Powell ......................... 62/129 |
| 5,352,858 A | 10/1994 | Keck ........................ 202/302.1 |
| 5,373,733 A | 12/1994 | Fuchs et al. ............... 73/118.1 |
| 5,619,022 A | 4/1997 | Long ............................ 200/83 |
| 5,689,963 A | 11/1997 | Bahel et al. ................. 62/129 |
| 5,702,592 A | 12/1997 | Suri et al. .................... 210/90 |

FOREIGN PATENT DOCUMENTS

EP    0808206 B1    2/1996

*Primary Examiner*—Marc S. Hoff
*Assistant Examiner*—Edward Raymond
(74) *Attorney, Agent, or Firm*—Baker & Hostetler, LLP (57) ABSTRACT

An apparatus for monitoring filter use in a compressed air system and indicating when filter element renewal is required on a differential pressure cost basis.

3 Claims, 4 Drawing Sheets

FILTER MONITOR

This application claims the benefit of Provisional Application No. 60/129,855 filed on Apr. 17, 1999.

BACKGROUND OF THE INVENTION

The compressed air stream generated by a compressor typically will include moisture, oil, particulates and other contaminants. To remove such contaminants, compressed air systems commonly are provided with filters, condensate traps, and similar air stream cleansing apparatus. Of course, because they capture and accumulate contaminants, periodic servicing is required to maintain the air cleansing apparatus in proper working order. In the case of filters, the filter element gradually loads with the contaminants, particulates for example, and periodic filter element servicing, either by cleaning or replacement, is required.

Air filters represent a cost of production of useable compressed air, the required periodic cleaning or replacement of the filter element being one element of such cost. In addition, however, a pressure drop occurs as the air stream passes through the filter, and the useable air pressure downstream of the filter is reduced accordingly. The cost of this pressure drop, in terms of the cost of power for the incremental compressor operation required to produce a minimum useable pressure downstream of the filter, is another cost element of compressed air production. Moreover, since the pressure drop across the filter will increase with increased filter loading, the cost of power for driving the compressed air through the filter increases as the filter loads.

The task of optimizing a compressed air system to operate satisfactorily at minimum cost includes minimizing filter operating cost. Optimization techniques for this purpose are known, for example such as disclosed on Page 2 of Ultrafilter News, January 1997, and related documents of Ultrafilter International. U.S. patents disclosing filters and filter housings or casings include U.S. Pat. No. Des. 255,045. U.S. Pat. No. Des. 297,349, 4,157,968 and U.S. Pat. No. 4.172, 798. U.S. patents disclosing differential pressure detection as by gauges and the like include U.S. Pat. Nos. 4,030,365, 4,347,744, 4,385,525, 4,559,834, 4,838,090, 4,890,497, 5,061,832, 5,183,983 and 5,373,746.

BRIEF SUMMARY OF THE INVENTION

The present invention relates to a novel and improved apparatus for optimizing compressed air filter operation by minimizing filter operating cost. The invention includes an electronic monitoring apparatus which monitors filter operation. Based on repetitive detection of the pressure drop across the filter and other parameters, including several programmed into the apparatus by the user, the apparatus indicates when filter element renewal is required. The apparatus can indicate required filter element replacement on any of several criteria, including a maximum time period of filter use, a maximum differential pressure across the filter, and a cost optimization technique which relies on comparison of filter operating cost with filter replacement or renewal cost. More specifically, the logic of the novel filter monitor assesses the tradeoff between filter element replacement or renewal cost and the escalating cost of the pressure drop across the filter as the contaminant loading in the filter increases through use.

The apparatus is self-contained, including its power source and all necessary programming options and displays, and is configured to be carried directly by the filter housing through connection to a conventional pressure gauge connection on the filter housing.

It is therefore one object of the invention to provide a novel compressed air filter monitoring apparatus.

Another object of the invention is to provide a compressed air filter monitor with integral programming capability.

A further object of the invention is to provide a compressed air filter monitor with a novel filter operating cost optimization scheme.

BRIEF DESCRIPTION OF THE DRAWINGS

These and other objects and advantages of the invention will be more readily appreciated upon consideration of the following detailed description, and the accompanying drawings, in which.

DESCRIPTION OF A PREFERRED EMBODIMENT

Figure 1:
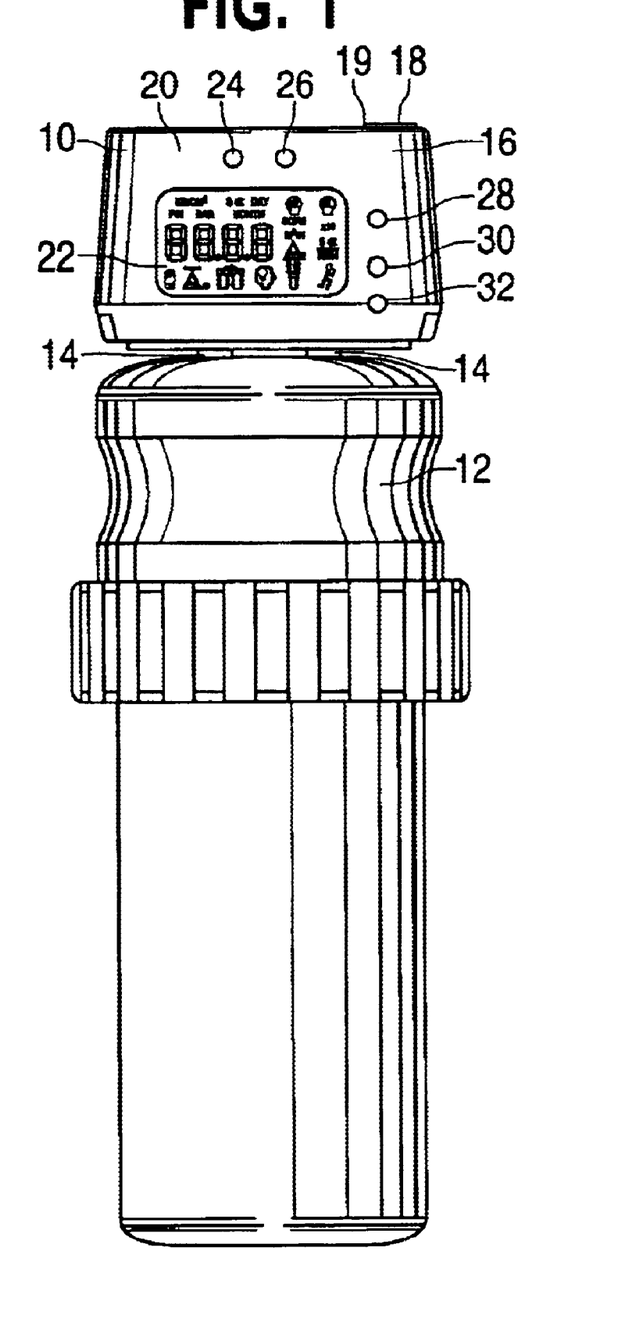
FIG. 1 is a front elevation of a filter monitor of the present invention carried by a filter housing.

There is generally indicated at 10 in FIG. 1 a filter monitor according to one presently preferred embodiment of the instant invention, the monitor 10 being mounted on a conventional filter housing 12 by any suitable means such as a pair of standard ⅜–24 UNF-2A threaded nipples 14, for example. One nipple 14 connects within housing 12 with the high pressure side of the filter element and the other with the low pressure side. The mounting of monitor 10 is structured to permit reversing the position of monitor 10 by rotation about its vertical axis so that it faces the opposite direction from that shown in FIG. 1, without disconnecting the nipples 14. This feature is discussed hereinbelow with reference to FIG. 4

Monitor 10 is comprised of a housing or enclosure 16 which contains all elements of the monitor. A battery compartment and closure (not shown) on the back of the monitor 10 receives suitable batteries to power the monitor, for example 3 standard type AA batteries. Concerning the battery performance specifications, the batteries should operate the LCD display for 15 months and the LED indicator described below for an additional seven days of continuous illumination. Other power connections are not required.

A standard connection such as an RJ-11 connector 18 (i.e., a standard modular telephone connection jack) is located atop the monitor 10 for remote communication purposes. Standard data corn format RS-232 may be used for such remote communication. Connector 18 may be provided with a dust cover 19 to protect the contacts when not in use. A low voltage digital signal corresponding to a filter change alarm signal may terminate at connector 18 to provide the option of a remote filter change alarm indication, although of course other data or alarm signals can also be directed via the connection at 18 to a remote location. Alternatively or in addition, if desired connector 18 may be used for connection to a remote power supply in lieu of battery power as described above.

Also incorporated within housing 16 is all required logic and computing circuitry, and a suitable differential pressure detection element (not shown), a conventional strain gage type sensor for example, which responds to the pressures supplied through nipples 14. The logic and computing circuitry is that required to perform all of the programming and analytical functions described below with reference to the FIG. 3 flow chart, and additionally a clock function not shown in FIG. 3 but included to allow the apparatus to monitor elapsed time.

The front face 20 of monitor 10 incorporates an LCD display 22 which includes all of the icons and numerals required for monitor programming and readouts, four pushbutton controls 24, 26, 28 and 30 for programming the monitor 10 and manipulating the display 22, and an LED alarm indicator 32. The buttons 24, 26, 28 and 30 provide left shift, right shift, scrolling and enter functions. These functions may be assigned to the described buttons as deemed suitable in accordance with such considerations of ergonomic design as ease, convenience and logic of use.

Figure 2:
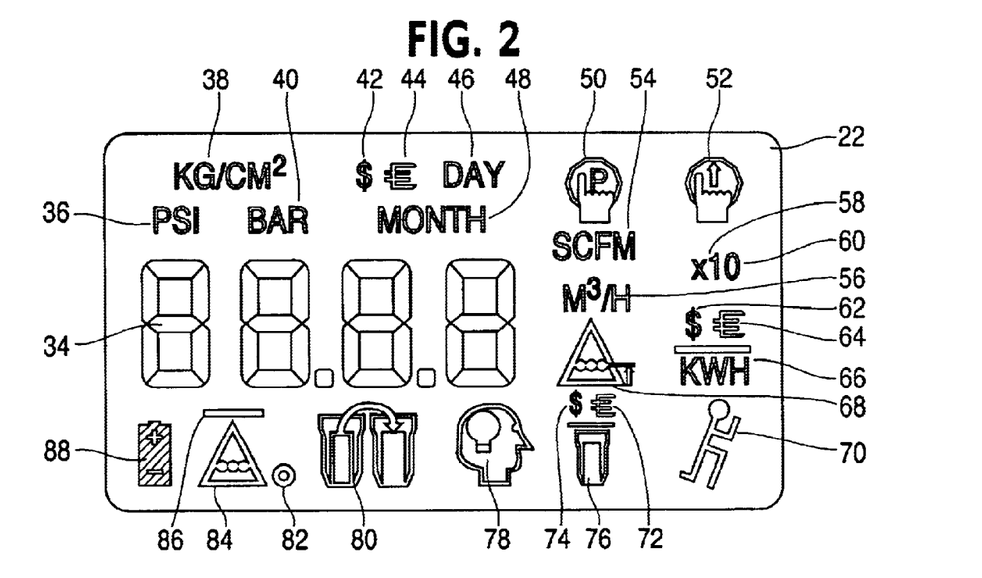
FIG. 2 is a detailed elevation of the display of the filter monitor of FIG. 1.

FIG. 2 shows the display 22 of monitor 10 in detail. Display 22 is preferably an LCD display with a positive reflective image viewing mode. It includes a four digit numeric section 34 in which each digit is a standard seven segment configuration, and a number of icons that are used by the operator for programming the monitor and interfacing with it. Starting at the upper left of display 22 and proceeding clockwise, the icons include:

36-differential pressure units; pounds per sq. inch
38-differential pressure units, kilograms per sq. centimeter
40-differential pressure units; bar
42-currency; US dollars
44-currency; Euros
46-estimated time to filter element renewal; days
48-set filter element changeout time limit; months
50-program mode icon
52-set time for filter change icon
54-flow rate units; std. cu. ft. per minute
56-flow rate units; std. cu. meters per hour
58-flow rate multiplier; X1
60-flow rate multiplier; X10 (used with 58)
62-electricity cost; US dollars
64-electricity cost; Euros
66-electricity cost; per kilowatt hour
68-set maximum allowable pressure drop icon
70-run mode icon
72-filter element cost units; Euros
74-filter element cost units; US dollars
76-filter element cost; per element
78-"intelligence working" icon (i.e., normal operation)
80-estimated time to filter renewal icon
82-running initial characteristic pressure drop icon (used with 84)
84-pressure drop display icon
86-average characteristic pressure drop icon (used with 84)
88-low battery indicator.

As a filter element becomes loaded with captured contaminants over time, it ultimately must be renewed by replacement or cleaning. (Although filter element replacement is the mode of filter renewal addressed in this description, in practice the mode of filter element renewal employed, whether replacement, cleaning, etc., will be that which offers the minimal filter renewal cost.) The monitor 10 provides an alarm indication to alert the operator to the need for filter renewal.

Figure 3:
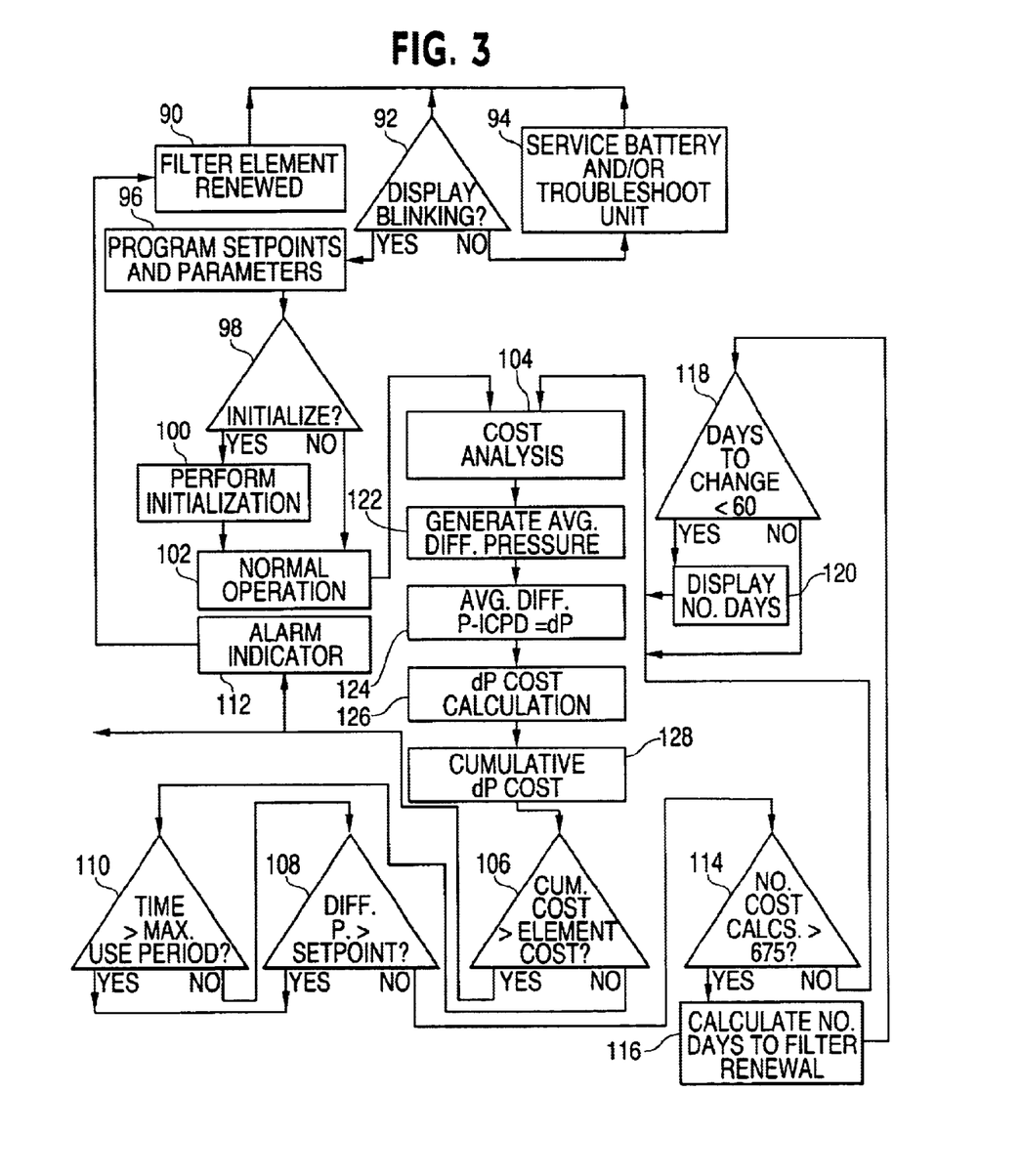
FIG. 3 is a flow diagram illustrating the operating paradigm of the invention.

As indicated at 90 in FIG. 3, upon renewal of the filter element, the monitor 10 is ready to be programmed to provide a filter element replacement alarm indication for the renewed filter element. If a low battery indicator is displayed, the batteries are removed and replaced. When the batteries are removed, programmed settings and cumulative data, are retained by the monitor 10. Upon reinstallation of batteries, the monitor display 22 will be blinking as indicated at 92 in FIG. 3. If the display 22 does not blink, further battery service or troubleshooting 94 may be required. Of course, a low battery condition may occur at any time, requiring replacement of the batteries. Upon battery replacement, no matter when performed, the display 22 should blink and the programming procedure must be performed to resume monitor operation; however, since all programmed values and cumulative data are retained during a power-off condition, restarting the monitor 10 after a battery replacement that is not coincident with filter element renewal merely involves stepping through the programming procedure, described below, without changing any programmed values.

The operator now programs the unit, indicated at 96, as follows. It is noted again that the arrangement of pushbuttons 24–30 is to accord with sound ergonomic design practice. The following description will refer to the pushbuttons only by function, not by specific button identities.

To begin programming, the operator presses and holds the enter button for a set period, three seconds for example, to place the monitor in the program mode which is indicated by display of program icon 50. The first program parameter is maximum time to filter change-out, in months. Thus, time set icon 52 is displayed and blinking, and the numeric display 34 shows 01 with the "ones" place holder blinking. Using the scroll push-button, the operator can selectively advance the numeric display from 01 to 15 to indicate 01 to 15 months to filter change-out. When the desired maximum filter change-out interval is displayed, the operator presses the enter button to program the change-out interval.

The next parameter in the programming sequence is maximum allowable pressure drop. Thus, when the maximum filter change-out interval has been programmed and entered, the time set icon disappears and the maximum allowable pressure drop icon 68 is displayed and blinking. Since the units of pressure must be selected, the PSI icon 36 is also blinking. With the scroll buttons, the operator selects the desired pressure units from among PSI icon 36, KG/CM$^2$ icon 38, and BAR icon 40. When the desired pressure unit icon is blinking, the user presses the enter button to program the selected pressure units. Numeric display 34 will now be blinking and displaying a numeric range dependent on the pressure units selected, as follows:

PSI: 00.0 to 15.0
BAR: 0.00 to 1.00
KG/CM$^2$: 0.00 to 1.00.

With the scroll buttons the user advances numeric display 34 to the desired maximum allowable pressure drop value, and presses the enter button to program the value.

The next parameter in the programming sequence is system flow rate. Thus, SCFM icon 54 is blinking. Using the scroll buttons, the user selects between flow rate units of SCFM and M$^3$/H, and the respective icon 54 or 56 blinks to indicate the units selected. The user presses the enter button to program the selected units. X1 icon 58, the multiplier icon, is now blinking. Once again using the scroll buttons the user selects between the X1 and X10 flow rate multipliers, and the respective icon 58, or 58 and 60, blinks to indicate the multiplier selected. The user presses the enter button to program the selected multiplier. Numeric display 34 is now blinking. Using the scroll buttons, the user enters the system flow rate, consistent with the flow rate units and multiplier previously selected, and presses the enter button to program the flow rate.

The next parameter in the programming sequence is electricity or power cost. Thus the electrical rate icon group 62, 64, 66 is displayed and the Dollar units icon 62 is blinking. With the scroll buttons, the user selects the appropriate cost unit from the Dollar and Euro choices. The selected cost unit blinks, and the user programs the selected cost unit with the enter button. Numeric display 34 is now blinking. With the scroll buttons the user sets the numeric value of power cost from the range 00.00 to 1.99, and with the enter button, programs the power cost.

The final parameter in the programming sequence is cost of filter element renewal, for example by filter element replacement. Thus, filter element cost icon group 72, 74, 76 is displayed. The user selects between the Dollar and Euro cost units and programs the units, and then sets and programs the numeric cost value in the range from 0000 to 9999, all essentially in the same manner as set forth directly above in the description of power cost parameter entry.

With entry of the power cost parameter, programming is complete and program icon 50 is no longer displayed. The run icon 70 is displayed and blinking.

Referring further to FIG. 3, initialization prior to normal operation is optional, as indicated at 98. If selected, an initialization procedure is performed by the monitor 10 prior to normal operation as indicated at 100. Details of the initialization process are described below. Although optional, initialization is a strongly recommended option since its result is used as a reference point in subsequent cost analyses. The initialization procedure provides an initial characteristic pressure drop, or ICPD, for the renewed filter element. Although this reference point could be ascertained by other methods, including a mere estimate or guess, the initialization procedure provides an ICPD which is tailored to the performance of the filter element actually in use, and thus should result in better optimization results in the cost analysis procedure. If initialization is not selected, the monitor 10 proceeds directly to normal operation as indicated at 102, using the most recently entered (or calculated) previous ICPD value.

Before describing the initialization procedure, certain details of monitor operation need to be noted. Operation of the monitor 10 includes determination of average differential pressure across the filter element by detecting the actual differential pressure and recording it in a memory register once every two seconds for a period of 16 seconds. Each resulting set of eight data elements is averaged to produce a single data point, or SDP, representing average differential pressure across the filter element for that 16 second period. A set of eight SDP values is produced once every 2 minutes, 8 seconds (i.e., approximately once every 2.13 minutes). Every hour of monitor operation thus generates 225 SDPs. Also, during normal operation the cost analysis calculation is repeated for each new set of eight SDPs, or once ever, 2 minutes, 8 seconds. Hence, 675 such cost analysis iterations occur in 1440 minutes or 24 hours, which is why the days-remaining calculation described hereinbelow is keyed to 675 cost analysis calculations. In normal operation, these values are used as described below to assess filter element operation; they are not used, however, during initialization, except in that they are counted to track progress of the initialization procedure.

Initialization is available when the run icon 70 is displayed and blinking. The user uses the scroll buttons to display the ICPD icon 82, 84, and then presses the enter button to begin initialization. During the initialization procedure, the first 16,384 SDPs (i.e., the first 72 hours, 49 minutes of operation) are ignored to allow the system to achieve steady state operation. The next 16,384 SDPs are averaged together to determine the ICPD for the filter element, which is then used after completion of the initialization procedure, together with other parameters as described below, to determine the optimum time for filter element renewal. When the second set of 16,384 SDPs have been averaged and the resulting ICPD saved for subsequent use, the initialization procedure is complete and the ICPD icon 82 is no longer displayed.

From initialization 100, or from programming 96 if initialization is not selected, the monitor switches to normal operation, which involves continuous monitoring of filter performance according to the programmed parameters and conditions. As noted above, filter element renewal can be indicated by any of three conditions: total operating time exceeding a set limit, filter pressure drop exceeding a maximum limit, or cumulative cost of filter pressure drop exceeding filter element renewal cost. The cost analysis, indicated beginning at 104, ends with the assessment of cumulative pressure drop cost versus filter renewal cost as indicated at 106. Details of the cost analysis are described below. Each of the other two conditions for filter renewal is also assessed, as indicated at 108 and 110, respectively, after each cost analysis iteration. If any of the three conditions is satisfied, the alarm indicator is triggered as indicated at 112. In the described embodiment, the alarm is the lighting of LED indicator 32. Concurrently with triggering of the LED 32, the LCD 22 displays the appropriate icon to indicate which of the three alarm parameters was exceeded. The user then renews the filter element, and the monitor is reprogrammed as needed.

If none of the three conditions for filter element renewal are satisfied, the cost analysis 104 is repeated after first performing a procedure, beginning at 114, to calculate and display the estimated number of days remaining until filter element renewal. This procedure is not performed until after 675 cost analysis iterations have been performed, as indicated at 114. Until reaching 675 calculations, the monitor bypasses the days-remaining procedure and goes directly to another cost analysis iteration 104, since 675 cost analysis iterations will take 24 hours. After 675 cost calculations, the estimated number of days to filter element renewal is calculated as indicated at 116. If the number of days remaining is less than 60 days, the number is displayed on the monitor numeric section 34, as indicated at 118 and 120, and the monitor then proceeds with another cost analysis iteration.

To calculate estimated days remaining until filter element renewal, the rate of increase in the cumulative differential pressure cost, which is calculated during the cost analysis procedure, is divided into the difference between the programmed filter element renewal cost and the current cumulative differential pressure cost.

In the cost analysis portion 104–106 of monitor operation, an average differential pressure first is generated as indicated at 122 in FIG. 3, by averaging the current set of eight SDPs. To determine differential pressure cost, the potentially avoidable differential pressure is first calculated by subtracting the saved ICPD value from the current average differential pressure as indicated at 124. The ICPD is excluded because only differential pressure in excess of the ICPD represents a potential optimization opportunity. That is, the only way to avoid the ICPD cost is to operate without any filter at all. The incremental cost of the resulting pressure drop is calculated as indicated at 126 using the formula:

$$dPCOST = \{6.761 \times 10^{-03} \times RATE + 2.17 \times 10^{-04}\} \times dP \times FM \times SCFM / 1000 \times TIME$$

where:
  dPCOST is the cost of pressure drop in Dollars or Euros
  RATE is the user's cost of power in Dollars or Euros per kWh
  dP is differential pressure in psi
  FM is a factory multiplier, most probably 1.0
  SCFM is the user entered maximum flow rate through the filter
  TIME is the time increment per calculation period, typically about 2.13 minutes.
  The incremental differential pressure (dP) cost calculated with each cost analysis iteration is
  added to the previous accumulated dP cost values as indicated at 128 to provide a repeatedly
  updated cumulative dP cost value. When that cumulative dP cost exceeds the filter element
  renewal cost, as indicated at 106, the filter element renewal alarm is triggered.

Figure 4:
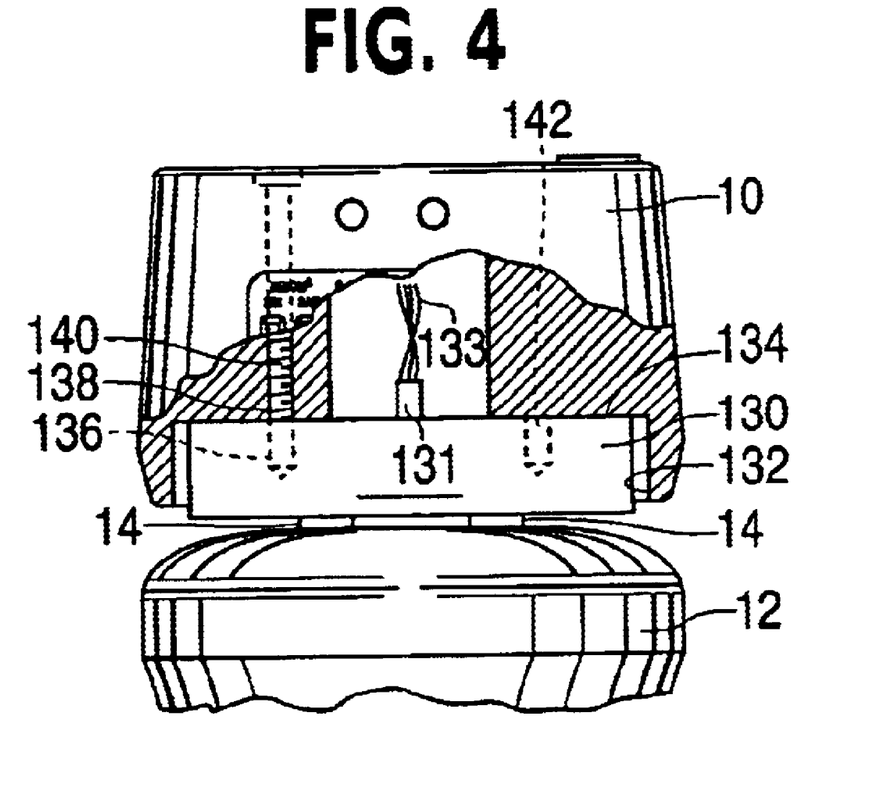
FIG. 4 is partially sectioned view similar to FIG. 1 showing some internal details of the invention.

FIG. 4 illustrates the internal structure of monitor 10 which permits it to be turned 180 degrees about its vertical axis from the position shown in FIG. 1. The monitor 10 includes a manifold block 130 that is mounted on the nipples 14. Manifold block 130 contains the differential pressure sensor (not shown) and the passages through which the high and low pressures, each applied through one of nipples 14, reach the differential pressure sensor. A suitable plug-in connector 131, which is hard-wired by leads 133 to the electronic circuitry of monitor 10, plugs into manifold block 130 as shown for connection to the output of the differential pressure sensor.

A recess 132 in the housing of monitor 10 receives manifold block 130 so that the monitor housing is supported on an upper surface 134 of manifold block 130. A vertical through bore 138 in the monitor housing is aligned with a threaded blind bore 136 in manifold block 130, and a screw 140 is passed through bore 138 and threaded into bore 136 to secure the monitor housing in place atop manifold block 130.

Leads 133 offer sufficient flexibility and slack to permit the monitor housing, upon removal of screw 140, to be lifted from manifold block 130, rotated 180 degrees, and replaced on manifold block 130. A second blind threaded bore 142 in manifold block 130, located symmetrically with bore 136, will now be aligned with bore 138. Upon replacement of screw 140, the monitor housing will be secured in a position rotated 180 degrees from its original position. This feature allows the filter monitor 10 to be mounted in whichever of the two opposed positions is more convenient for monitor use and access, without having to make any changes to the high and low pressure porting.

Additional details of the invention include the following. During normal operation the intelligence icon 78 is displayed and blinking, and the numeric field 34 continuously cycles through readouts of three parameters: current differential pressure, average differential pressure, and estimated days remaining until filter element renewal (if less than 60 days) at a rate of six seconds per parameter. The user can cycle through and review all programmed settings using the enter button.

As noted above, since there is no reset mode, the most current programmed values will always be displayed, even when the user wishes to reprogram the monitor. Hence, if a new value is not entered for any given parameter during programming, operation will proceed with the most recently entered previous value.

It is not necessary that assessment of the three conditions for filter renewal, indicated at 106, 108 and 110 in FIG. 3, be performed in any particular order, so long as all are performed after each cost analysis iteration. Finally, although environmental and other limitations for the monitor can vary within a wide latitude of design possibilities, design specifications for the preferred embodiment include a maximum working pressure of 250 psig with a 5:1 safety factor, a maximum compressed air temperature of 180° F., and maximum and minimum ambient temperatures of 130° F. and 30° F., respectively.

In an alternative operational method for monitoring filter element performance and indicating the need for filter element replacement, a cost-oriented approach is also provided. The device will monitor the differential pressure generated across the filter element, and, through its electronic intelligence, determine the proper time for the element to be changed. An LCD display is used to interface with the user.

The differential pressure across the element is sensed and translated into an electrical signal. The electronics will also generate a clock function so that elapsed time can be monitored. The criteria used to determine the proper time for an element change out will be through any one of the following three (3) modes which are monitored simultaneously:

A. Time based. The filter monitor will indicate the need for an element change after a factory preset time period of one (1) year, or a user-defined time period (for example, 1 to 15 months, at 30 and 31 days per month, alternately).

B. Differential pressure based. The filter monitor will indicate the need for an element change due to excessive differential pressure based on a factory preset value of about 10 psid (0.7 bar), or a user selected differential pressure set point (for example, 1 to 15 psid, 0.07 to 1.0 bar). This differential pressure limit will be conditioned in such a way as to prevent "nuisance tripping" during flow surges, pressurization, depressurization, etcetera. This is accomplished by a two (2) minute time delay function.

C. "Avoidable energy loss" based. The logic of the device will determine for the user the optimum time for an element change out based on total energy loss (pressure drop over time) which can be attributed to particulate loading on the element. This function will reference the "learned" performance of a clean element for the specific application, so as to account only for energy losses which are a function of active air treatment (i.e., the removal of contaminants). A factory defined set point will be embedded in the software which is specific to the element type. These set points were determined by evaluating the potential effects of particulate loading on filter performance (efficiency). The only set-up information required to perform this calculation is the element type, or grade.

Preferably, all information will be entered by the user through the use of the LCD and four (4) small buttons; one (1) for left directional shift, one (1) for right directional shift, one (1) for scrolling through numeric ranges, and one (1) for entering values. The use of an external programming device will not be required.

The units of measure for the display will be selected by the user. This will be a part of the set-up menu. Differential pressure will be displayed in either:

psi
bar
kg/cm²

The connection to the filter head will be through the existing ⅜–24 UNF-2A threads used for our current differential pressure indicator. The design of the housing will also permit the unit to be used as a stand alone device.

The device will be powered using three (3) standard type "AA" batteries and not require any other utility connections. An LED will be used to alert the customer when the element should be changed, as well as a low battery condition.

Preferably, an RJ-11 connection is provided and located on the top of the device for communication purposes. For the initial design, a simple, low voltage digital signal will be terminated at this location. This signal will be in parallel with the alarm LED, indicating the time for a filter change, or an alarm (device fault) condition.

In an alternate embodiment, one (1) set of "dry" normally open contacts for customer remote monitoring are provided. These will not be an integral part of the device. Due to size and energy consumption restrictions, this is most preferably accomplished through an auxiliary device which connects to the RJ-11 connection on the filter monitor.

The display can be viewed from the "front" of the filter or the "back". This will be achieved by simply turning the display around on the "base manifold".

The maximum working pressure of the filter monitor will be 250 psig (17.2 bar), with a 5:1 safety factor. The maximum working compressed air temperature will be 180° F. (82° C.). The maximum ambient temperature will be 130° F. (54° C.), and the minimum ambient temperature will be 10° F. (−12° C.).

III. Performance Goals

Preferably, the battery will have a life expectancy of 15 months operating the LCD display only, and an additional 7 days of LED illumination, thereafter. The programmed settings and cumulative information are retained during battery expiration and change-out.

For calculation and data storage purposes, the determination of the average differential pressure is accomplished by recording the differential pressure into memory every two (2) seconds for a period of sixteen (16) seconds. This data is then be averaged into a single reading and termed a "single data point" (SDP). Every hour of operation generates 225 SDPs. The display reading will be updated every eight (8) SDPs (2 minutes, 8 seconds).

The operator "characterizes" the system by implementing a learning period for the filter monitor. After installing a new filter element, the user will instruct the filter monitor to begin the initialization period. The first 16,384 SDPs (72 hours, 49 minutes) of operation will be ignored to allow the elements to load and achieve steady state. The following 16.384 SDPs (72 hours, 49 minutes) will be averaged together to determine the initial characteristic pressure drop (ICPD) of the system. The differential pressure calculations used to determine the optimum time for element change-out then use this ICPD as a reference point. The rules governing the avoidable energy loss logic are as follows:

A. The element should be changed as soon as the cumulative avoidable energy losses of the element exceed the factory determined set point.

B. Cumulative avoidable energy losses are calculated using the ICPD as a reference point; i.e., the pressure drop that is in excess of the ICPD is used for calculating cumulative avoidable energy losses, not the absolute value of pressure drop.

C. After each 2 minute, 8 second time period, the eight (8) SDPs will be averaged together. The ICPD will be subtracted from this average to obtain the actual pressure drop used for the energy loss calculation. This incremental energy loss will be calculated and added to the cumulative sum of previous energy losses.

D. The cumulative sum will be compared to the factory determined value. If the sum is less than the factory set point, the filter monitor continues the cycle of calculations. Once the sum exceeds the set point, the alarm LED will be activated to indicate that the element should be changed.

E. After each 675 cost calculations (i.e., 24 hours), the filter monitor will calculate the number of days until the element needs changed. This is accomplished by calculating the rate of increase in the cumulative sum, and dividing it into the difference between the set point and the current cumulative sum. Preferably, this is not displayed until the estimated time until change-out reaches sixty (60) days.

F. When the unit alarms to indicate the element change out, the appropriate icon shall be displayed informing the user as to which alarm parameter was exceeded.

G. The unit will also indicate any device malfunctions and low battery levels.

The liquid crystal display (LCD) will automatically cycle the following read-outs at a six (6) second rate:

Current differential pressure
Average differential pressure
Remaining days until element change out (estimated)

IV. Physical Description

The filter monitor consists of an ABS plastic (impact and chemical resistant) housing approximately four (4) inches wide by two (2) inches high by three (3) inches deep. The front of the unit contains the liquid crystal display, the red LED alarm light and the buttons used for setting up the unit.

The liquid crystal display area is two (2) inches wide by one and one-eighth (1⅛) inches high. The viewing mode is a positive reflective image. The display consists of a four (4) digit, seven (7) segmented numeric section, and several icons used for programming and operator interface.

The red LED shall be on the front of the unit, as visible as possible from all angles, yet slightly protected (or recessed) by the plastic housing.

There are be four (4) buttons on the front of the unit; one (1) for left directional shift, one (1) for right directional shift, one (1) for scrolling up through numeric ranges, and one (1) for entering values. Once a value or parameter is properly displayed (using the directional shift and scroll buttons), the enter button will input the value or parameter into the program.

The left and right side of the filter monitor will be unpopulated due to the clearance requirements for mounting multiple filters in series.

The top of the filter monitor shall contain the RJ-11 (phone jack) connection used for communications, and it is provided with a dust cover.

The top or rear of the filter monitor shall provide the access to the battery compartment.

Descriptive Operation

A. The battery is inserted in the compartment and the cover is closed.

The display is now functional. All segments will blink to provide a display test and indicate the need for the operator to enter the program mode.

B. The operator presses and holds the enter button for three (3) seconds. This places the filter monitor in a program mode. The program icon is displayed.

C. The first program parameter is the maximum time until filter change-out, in months. The allowable range is 1–15 months. The time set icon is displayed and blinking. The numeric display shows 01, with the "ones" place holder blinking. The user can then advance the numbers from 01 to 15 using the scroll up button. Once the value is displayed, press enter.

D. The next parameter to program is the maximum allowable pressure drop. After selecting the time parameter in C) above, the max delta P icon is displayed and blinking. The units of measure are now selected. The "psig" icon is displayed and blinking. Using the scroll up button, the user chooses between the "psig" icon, the "barg" icon and the "kg/cm$^2$" icon. Press enter to confirm the selection.

E. The numeric display is now blinking. The numeric range is dependant upon the units of measure selected:
psig: 00.0 to 15.0
barg: 0.00 to 1.00
kg/cm$^2$:0.00 to 1.00

Using the scroll up button, the user advances the display through the proper range. Once the value is displayed, press enter.

F. The final parameter to input is the element type. The element icon is displayed and blinking. The element type selection menu is displayed. This menu may be customized for a particular user so as to maximize user friendliness. Using the scroll up button, the user advances the display through the selections. Once the correct element type is displayed, press enter.

G. The set up is now complete. The program icon is no longer displayed. The initial characteristic pressure drop must now be established.

H. The "start running" icon is displayed and blinking, as well as the initialization icon. The user presses the scroll up button to turn off the ICPD icon if the initialization period is not required (see "Performance Goals" above). To begin the initialization period, press enter. The start icon is no longer displayed and the ICPD icon is displayed, not blinking. The LCD displays the current pressure drop (with current pressure drop icon and units of measure icon) and remains in this mode until this portion of the program is complete. If the user decides not to initialize the filter monitor, the unit will restart using the previous ICPD value.

I. At the completion of the ICPD, the ICPD icon is no longer displayed. The intelligence icon is displayed and blinking. The LCD then cycles readings and begins calculations (see "Performance Goals" above).

J. The user will be able to review all of the settings by entering the program mode and using the enter button to cycle through the values. There will be no reset mode; each time the program mode is entered, the previous set of values will be displayed.

According to the description hereinabove, we have invented a novel and improved filter monitor. The above describes a presently preferred embodiment of the invention. We have envisioned and anticipated numerous other embodiments and modifications which certainly would occur to others versed in the art once they were apprised of our invention. For example, with appropriate modification of the programming paradigm and parameters, the described filter monitor may be used with filters for any fluid, whether gas or liquid, water filters for example, to monitor filter performance and provide a signal indicating the need for filter element renewal based on the three defined limiting conditions of differential pressure cost, maximum filter use period and maximum differential pressure.

What is claimed is:

1. A method of determining the operating condition of a filter device for a compressed air system in which the filter device is placed in line in a compressed air stream, said method comprising the steps of:
   i. determining an initial characteristic pressure drop across the filter device;
   ii. determining an average differential pressure across the filter device during operation of the compressed air system during a predetermined time period;
   iii. calculating an actual pressure drop across the filter device by subtracting the initial characteristic pressure drop from the average differential pressure;
   iv. continuously repeating step iii, and summing said actual pressure drop values to calculate a cumulative avoidable energy loss; and
   v. comparing said cumulative avoidable energy loss with a predetermined value.

2. The method as recited in claim 1, further providing the step of providing an indication of a need to replace the filter device when the cumulative avoidable energy loss exceeds the predetermined value.

3. The method as recited in claim 1, further comprising the step estimating a number of days until filter device replacement by calculating a rate of increase in the cumulative avoidable energy loss at a predetermined time period and dividing said rate of increase in the cumulative avoidable energy loss into the difference between said initial characteristic pressure drop and a current cumulative sum at said predetermined time period.

* * * * *